United States Patent
Hirasawa et al.

(10) Patent No.: US 8,342,629 B2
(45) Date of Patent: Jan. 1, 2013

(54) LIQUID EJECTING APPARATUS AND CONTROLLING METHOD OF THE SAME

(75) Inventors: Masahiko Hirasawa, Sapporo (JP);
Junichi Takenuki, Sapporo (JP);
Atsushi Nagahara, Chino (JP);
Masanori Tanizaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 12/699,755

(22) Filed: Feb. 3, 2010

(65) Prior Publication Data
US 2010/0194807 A1 Aug. 5, 2010

(30) Foreign Application Priority Data
Feb. 5, 2009 (JP) .................................. 2009-024399

(51) Int. Cl.
*B41J 29/38* (2006.01)
(52) U.S. Cl. .......................................... 347/14; 347/19
(58) Field of Classification Search .................... 347/14, 347/19
See application file for complete search history.

(56) References Cited

U.S. PATENT DOCUMENTS

| | | | |
|---|---|---|---|
| 5,813,333 A | | 9/1998 | Ohno |
| 6,076,915 A | * | 6/2000 | Gast et al. .................... 347/19 |
| 2006/0158475 A1 | * | 7/2006 | Arquilevich et al. ......... 347/19 |

FOREIGN PATENT DOCUMENTS

| | | |
|---|---|---|
| JP | 06-344542 A | 12/1994 |
| JP | 07-266548 A | 10/1995 |
| JP | 08-052861 A | 2/1996 |
| JP | 2000-318132 A | 11/2000 |
| JP | 2007-030173 A | 2/2007 |
| JP | 2008-100466 A | 5/2008 |

* cited by examiner

*Primary Examiner* — Laura Martin
(74) *Attorney, Agent, or Firm* — Kilpatrick Townsend & Stockton LLP

(57) ABSTRACT

A liquid ejecting apparatus executes a collective multiple liquid ejecting process of ejecting a liquid so as to superimpose the predetermined number of unit images on basic images formed on a target. The liquid ejecting apparatus includes: an ejection executing unit which ejects the liquid onto the target from an ejecting head; a position acquiring unit which acquires arrangement positions of the predetermined number of two or more basic images, at which an arrangement image in which the predetermined number of two or more unit images are arranged among the plurality of basic images formed on the target is superimposed; an image adjusting unit which detects an error between the acquired arrangement positions of the basic images and arrangement positions of the predetermined number of two or more unit images, and adjusts the arrangement positions of the unit images by allocating the detected error to each unit image.

18 Claims, 7 Drawing Sheets

LIQUID EJECTING APPARATUS AND CONTROLLING METHOD OF THE SAME

This application claims priority to Japanese Patent Application No. 2009-024399, filed Feb. 5, 2009, the entirety of which is incorporated by reference herein.

BACKGROUND

1. Technical Field

The present invention relates to a liquid ejecting apparatus and a controlling method of the same.

2. Related Art

In the past, as an apparatus superimposing a plurality of images, there was suggested a bag making apparatus which calculates a print pitch (shift quantity) of a film in which a plurality of images are arranged by measuring a distance between an n-th image and an n+1-th image neighboring the n-th image and which controls a stepping motor so as to correct the difference in the pitch of the film when the cumulative value of shift quantities exceeds a reference value (see JP-A-2008-100466, for example). The bag making apparatus is capable of precisely correcting the difference in the pitch of the film.

In the bag making apparatus disclosed in JP-A-2008-100466, however, when the shift amounts of the adjacent images continuously exceed the reference value, for example, a process of sequentially correcting the difference in the adjacent images and pasting the images has to be executed. For this reason it may take more time to execute this process. As an apparatus superimposing a plurality of images, JP-A-2008-100466 or the like discloses a liquid ejecting apparatus which ejects ink on a print medium in a printing process so as to superimpose the plurality of images, for example. The liquid ejecting apparatus also executes the printing process so as to superimpose images on basic images when the basic images are printed. However, in order to prevent the difference between the images, the positions of the images are generally confirmed one by one and the difference is corrected to form the subsequent images. Therefore, a problem may arise in that the processing time is longer in executing the liquid ejecting process of superimposing the image.

SUMMARY

An advantage of some aspects of the invention is that it provides a liquid ejecting apparatus and a controlling method of the same capable of further shortening the processing time in a collective multiple liquid ejecting process of superimposing unit images on basic images.

According to aspects of the invention, the following units are provided.

According to an aspect of the invention, there is provided a liquid ejecting apparatus executing a collective multiple liquid ejecting process of ejecting a liquid so as to superimpose the predetermined number of unit images on basic images formed on a target. The liquid ejecting apparatus includes: an ejection executing unit which ejects the liquid onto the target from an ejecting head; a position acquiring unit which acquires arrangement positions of the predetermined number of two or more basic images, at which an arrangement image in which the predetermined number of two or more unit images are arranged among the plurality of basic images formed on the target is superimposed; an image adjusting unit which detects an error between the acquired arrangement positions of the basic images and arrangement positions of the predetermined number of two or more unit images, and adjusts the arrangement positions of the unit images by allocating the detected error to each unit image; and an ejection controlling unit which controls the ejection executing unit to execute the collective multiple liquid ejecting process of ejecting the liquid by using the unit images of which the arrangement positions are adjusted, so that each arrangement image in which the predetermined number of two or more unit images are arranged is superimposed on the predetermined number of two or more basic images formed on the target.

The liquid ejecting apparatus executes the collective multiple liquid ejecting process of ejecting the liquid so that each arrangement image in which the predetermined number of two or more unit images are superimposed on the predetermined number of two or more basic images formed on the target. When the collective multiple liquid ejecting process is executed, the arrangement position of the predetermined number of two or more basic images, at which the arrangement image in which the predetermined number of two or more unit images are arranged is superimposed, among the plurality of basic images formed on the target is acquired, the error between the acquired arrangement positions of the basic images and the arrangement positions of the predetermined number of two or more unit images is detected, and the detected error is allocated to each unit image to adjust the arrangement positions of the unit images. Then, the collective multiple liquid ejecting process is executed at the adjusted arrangement positions of the unit images by using the unit images. In this way, the predetermined number of unit images are formed on the predetermined number of basic images at one time by acquiring the arrangement positions of the predetermined number of two or more basic images and correcting the error. Accordingly, it is possible to further shorten the processing time in the collective multiple liquid ejecting process, compared to a case where the position of the basic image is acquired for each one unit image to correct the position, for example.

In the liquid ejecting apparatus according to the above aspect of the invention, the ejection executing unit may include a scanning unit which scans the ejecting head in a liquid ejection area where the arrangement image in which the predetermined number of two or more unit images are arranged is formed on the target and a transporting unit which transports the target in each area of the target where the predetermined number of two or more basic images are formed. The ejection controlling unit may control the transporting unit so that the area of the target where the predetermined number of two or more basic images are formed is fixed in the liquid ejection area and forms the unit images, of which the arrangement positions are adjusted, on the predetermined number of two or more fixed basic images by controlling the scanning unit and the ejecting head so as to scan the ejecting head. With such a configuration, since the predetermined number of unit images are formed on the basic images by transporting the target and correcting the positions of the predetermined number of basic images, the processing capability of the liquid ejecting apparatus can be utilized as much as possible and the processing time can further be shortened.

In the liquid ejecting apparatus according to the above aspect of the invention, the image adjusting unit may determine whether the sizes of the unit images falls in a predetermined allowable range with respect to the size of the basic images on the basis of the detected error. The image adjusting unit may change the unit images on the basis of the acquired sizes of the basic images and adjusts the arrangement positions of the changed unit images when the determination result exceeds the predetermined allowable range, and adjusts the arrangement positions of the unit images without changing the unit images when the determination result falls in the predetermined allowable range. The ejection executing unit may execute the collective multiple liquid ejecting process in the state where the arrangement positions of the unit images are adjusted. With such a configuration, it is possible to further shorten the processing time without changing the unit images when the determination result falls in the allowable range. Alternatively, the unit images are changed, when the determination result exceeds the allowable range. In this way, it is possible to further inhibit the difference between the unit images and the basic images. Here, "the predetermined allowable range" may be set from experience as a range (for example, several pixels) in which it is difficult to observe the position difference between the basic image and the unit image. At this time, when the unit image is larger than basic image upon changing the unit image, the image adjusting unit may execute at least one of removing an excessive area of the unit image larger than the basic image and contracting the unit image. When the unit image is smaller than the basic image upon changing the unit image, the image adjusting unit may execute at least one of inserting a specific color into the unit image, repeatedly inserting an end portion of the unit image into the unit image, and expanding the unit image. By removing the excessive areas from the basic images, inserting the specific color into the unit images, and repeatedly inserting the end portions into the unit images, it is possible to further inhibit the difference between the basic images and the unit images by a simpler process. Moreover, by contracting and expanding the unit images, it is possible to inhibit the difference between the basic images and the unit images more reliably.

In the liquid ejecting apparatus according to the above aspect of the invention, the image adjusting unit may reproduce the unit images by using a reproduction function provided as a basic function, allocate the detected error to the reproduced unit images, and adjust the arrangement positions of the unit images. With such a configuration, by using the basic function, it is possible to further shorten the processing time in the collective multiple liquid ejecting process by the simpler process.

In the liquid ejecting apparatus according to the above aspect of the invention, the position acquiring unit may acquire the arrangement positions of the predetermined number of two or more basic images, at which the arrangement image is superimposed, by scanning the target and executing reading by a reading sensor. With such a configuration, it is possible to acquire the arrangement positions of the basic images more reliably. Here, upon "scanning and reading the target", the reading sensor may be fixed and the target may be transported so that the reading sensor reads the arrangement positions. Alternatively, the reading sensor may be scanned and the target may be fixed so that the reading sensor reads the arrangement positions. Upon acquiring the arrangement positions of the predetermined number of two or more basic images, the position acquiring unit may acquire the arrangement positions of the predetermined number of two or more basic images at which the arrangement image is superimposed, by scanning the target and causing the reading sensor to read the positions of the eye marks in that the plurality of eye marks are arranged on the target and the basic images are formed on the basis of the positions of the eye marks.

In the liquid ejecting apparatus according to the above aspect of the invention, the plurality of basic images may be arranged on the target in a transport direction of the target. The ejection executing unit may include a scanning unit which scans an ejecting head ejecting the liquid in a liquid ejection area, where the arrangement image in which the predetermined number of two or more unit images are arranged is formed, in the transport direction of the target and a transporting unit which transports the target in each area of the target where the predetermined number of two or more basic images are formed, and the ejecting head is provided with a reading sensor which reads an image. The ejection controlling unit may control the transporting unit so that the area of the target where the predetermined number of two or more basic images are formed is fixed in the liquid ejection area, forms the arrangement image, of which the arrangement positions are adjusted, on the predetermined number of two or more fixed basic images by controlling the scanning unit and the ejecting head so that the ejecting head scans outward along the transport direction of the target, transports and fixes the target so that the area of the target where the predetermined number of two or more subsequent basic images are formed is placed in the liquid ejection area after the formation of the arrangement image, and controls the scanning unit after the fixation of the target so that the ejecting head scans inward along the transport direction of the target. The position acquiring unit may acquire the arrangement positions of the predetermined number of two or more subsequent basic images when the reading sensor reads the target by scanning the coming passage of the transport direction of the target. With such a configuration, since the liquid ejecting process is executed upon scanning the going passage by the ejecting head and the positions of the subsequent basic images are acquired upon scanning the coming passage in the collective multiple liquid ejecting process, it is possible to further shorten the processing time in the collective multiple liquid ejecting process, compared to a case where the acquiring of the positions of the basic images and the liquid ejecting process are separately executed, for example.

According to another aspect of the invention, there is provided a method of controlling a liquid ejecting apparatus which includes an ejection executing unit ejecting a liquid onto a target from an ejecting head and which executes a collective multiple liquid ejecting process of ejecting the liquid so that predetermined unit images are superimposed on basic images formed on the target. The method includes: (a) acquiring arrangement positions of the predetermined number of two or more basic images, at which an arrangement image in which the predetermined number of two or more unit images are arranged among the plurality of basic images formed on the target is superimposed; (b) adjusting the arrangement positions of the unit images by allocating an error between the acquired arrangement positions of the basic images and the arrangement positions of the predetermined number of two or more unit images on which the collective multiple liquid ejecting process is executed, to the unit images; and (c) controlling the ejection executing unit to execute the collective multiple liquid ejecting process of ejecting the liquid in the state where the arrangement positions are adjusted in (b), so that each arrangement image in which the predetermined number of two or more unit images are arranged is superimposed on the predetermined number of two or more basic images formed on the target.

In the method of controlling the liquid ejecting apparatus, like the above-described liquid ejecting apparatus, since the arrangement positions of the predetermined number of two or more unit images are acquired at one time and the error is corrected to form the predetermined number of unit images on the predetermined number of basic images, it is possible to further shorten the processing time in the collective multiple liquid ejecting process, compared to a case where the position of the basic image is acquired for each one unit image to correct the position, for example. Moreover, in the method of controlling the liquid ejecting apparatus, a variety of shapes of the above-described liquid ejecting apparatus may be used. A step of realizing each function of the above-described liquid ejecting apparatus may further be provided.

According to still another aspect of the invention, there is provided a program causing one or plural computers to realize each step of the method of controlling the above-described liquid ejecting apparatus. The program may be recorded in a computer readable recording medium (for example, a hard disk, a ROM, an FD, a CD, or a DVD), may be delivered from a computer to another computer through a transporting medium (a communication network such as the Internet or a LAN), or may be transmitted or received in other forms. When the program is executed in one computer or a plurality of computers to allocate the steps, the steps of the method of controlling the liquid ejecting apparatus are executed. Accordingly, it is possible to obtain the same advantages as those of the controlling method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
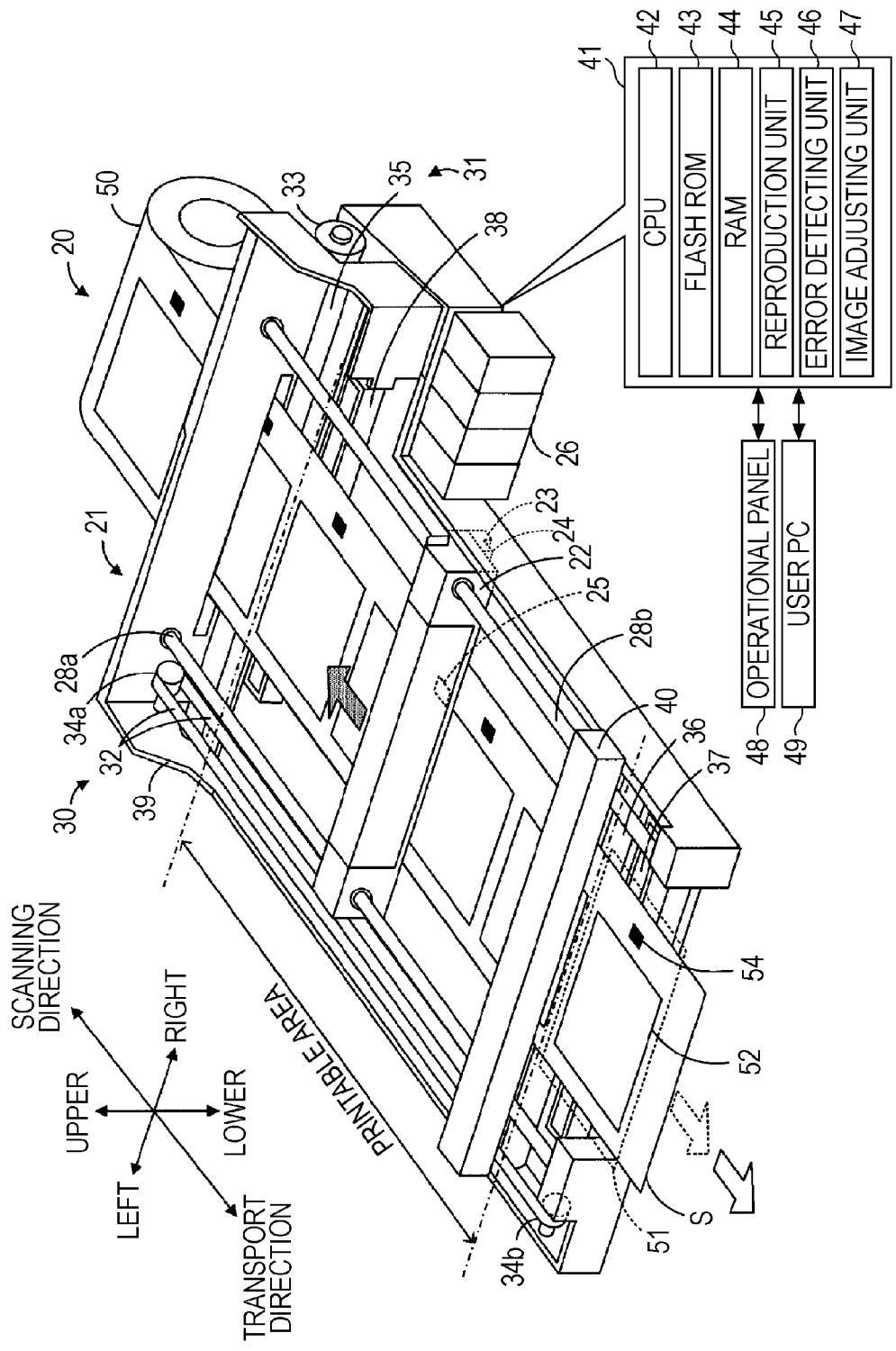
FIG. 1 is a diagram illustrating the overall configuration of a printer according to an embodiment.

Next, an embodiment of the invention will be described with reference to the drawings. FIG. 1 is a diagram illustrating the overall configuration of a printer 20 according to this embodiment. As shown in FIG. 1, the printer 20 according to this embodiment includes a printing head 24 formed with a length equal to or larger than the width of the maximum size of a usable print sheet S. The printer 20 is configured as an ink jet printer which loads a roll sheet 50 from which the print sheets S are taken out and which is capable of printing a plurality of pages collectively. The printer 20 includes: a printing mechanism 21 which ejects ink serving as a liquid onto the print sheet S, which serves as a target, transported from the rear side to the front side in the drawing; a carriage moving mechanism 30 which moves a carriage 22 formed with a length equal to or larger than the width of the print sheet S in a predetermined scanning direction (the front side and the rear side in FIG. 1); a sheet feeding mechanism 31 which is driven by a driving motor 33 to transport the print sheet S in the transport direction; cleaning mechanisms 37 and 38 which are formed on the downstream side and the upstream side in a transport direction of the print sheet S in the transport direction; an operational panel 48 which displays a screen of information or receives an input from a user; and a controller 41 which controls the printer 20 as a whole.

The printing mechanism 21 includes the carriage 22 held so as to be movable along guides 28a and 28b formed in the right and left portions of case 39 in front and rear directions (scanning direction) of the main body by a carriage belt 32; the printing head 24 which is disposed below the carriage 22 and pressurizes ink of respective colors to eject ink droplets as a liquid from nozzles 23; and ink cartridges 26 which are mounted on the case 39, store ink of respective colors, and supply the stored ink to the printing head 24 through tubes (not shown). The carriage 22 is moved in a wide range (printable area) on the rear and front sides in the drawing when the carriage belt 32, which is placed between a carriage motor 34a disposed on the left rear side of the case 39 and a driven roller 34b disposed on the left front side of the case 39, is driven by the carriage motor 34a. The carriage moving mechanism 30 includes the guides 28a and 28b, the carriage belt 32, the carriage motor 34a, and the driven roller 34b. The printing head 24 is disposed in the lower portion of the carriage 22. The printing head 24 ejects the ink of respective colors from the nozzles 23, which are formed on the bottom surface of the printing head 24, in a method of applying voltage to piezoelectric elements, deforming the piezoelectric elements, and pressurizing the ink. Moreover, a mechanism for applying pressure to the ink may be a unit which generates bubbles by heat of a heater. A reading sensor 25 capable of reading light emitted to the print sheet S and reflected from the print sheet S to analyze the reflected light into the respective colors is disposed on the lower surface of the printing head 24. The reading sensor 25 reads an eye mark 54, which indicates the position of a page area 51 and is formed in advance on the print sheet S, and detects the position of the page area 51 where a basic image 52 is formed. The ink cartridges 26, which are of so-called off-carriage type, are mounted on the front of the case 39 and store cyan (C) ink, magenta (M) ink, yellow (Y) ink, and black (K) ink, respectively.

The sheet feeding mechanism 31 includes a sheet feeding roller 35 disposed on the feeding position of the print sheet S and a transporting roller 36 disposed on the discharge side of the print sheet S. The sheet feeding mechanism 31 is configured to scan the carriage 22 and intermittently transport the print sheet S by setting a predetermined area in the printable area, where a printing process is possible, as one unit. Even though not shown in FIG. 1, a transporting belt which transports the print sheet S and serves as a platen is disposed below the lower surface of the print sheet S to transport the print sheet S placed on the transport belt to the downstream side.

During the printing process, the cleaning mechanisms 37 and 38 execute a process of eliminating nozzle clogging of the nozzles 23 at predetermined time, for example, at time in which the print sheet S does not reach the sheet feeding roller 35 or after time in which the print sheet S is cut by a cutting mechanism 40. The cleaning mechanisms 37 and 38 are used to execute the cleaning process of removing the ink clogged in the nozzles 23.

The operational panel 48 is a device used for a user to input a variety of instructions to the printer 20. The operational panel 48 includes a display unit which has a color liquid crystal panel displaying characters or images in response to the variety of instructions or an operational unit which has upper, lower, right, and left keys, a selection key, and a cancel key.

The controller 41 formed as a microprocessor mainly using a CPU 42 includes: a flash ROM 43 which is capable of storing a variety of process programs and rewriting data; a RAM 44 which temporarily stores data or reserves data; a reproduction unit 45 which has a circuit executing a function of simply reproducing an image as a basic function; an error detecting unit 46 which detects an error between the arrangement position of the basic image 52 formed on the print sheet S and the arrangement position of a unit image to be printed now; and an image adjusting unit 47 which adjusts the position or size of the unit image. The controller 41 controls the printing mechanism 21, the carriage moving mechanism 30, and the sheet feeding mechanism 31 to execute a printing process (liquid ejecting process).

In the printer 20, a collective multiple printing process of executing a printing process is executed by repeatedly: fixing the print sheets S, where the basic images 52 are formed in the page areas 51 of the predetermined number (for example, four pages) of two or more pages, to the printable area; causing the printing head 24 to execute the printing process on the predetermined number of basic images 52, while scanning the printing head 24 along the guides 28a and 28b in the scanning direction; and transporting the print sheets S so that the areas of the print sheets S, on which a plurality of subsequent basic images 52 are formed, fall in the printable area. In the collective multiple printing process, the carriage moving mechanism 30 scans the carriage 22 in a printable range under the control of the controller 41, and the sheet feeding mechanism 31 transports and fixes the print sheets S unrolled from the roll sheet 50 in each area containing the predetermined number of basic images 52.

Figure 2:
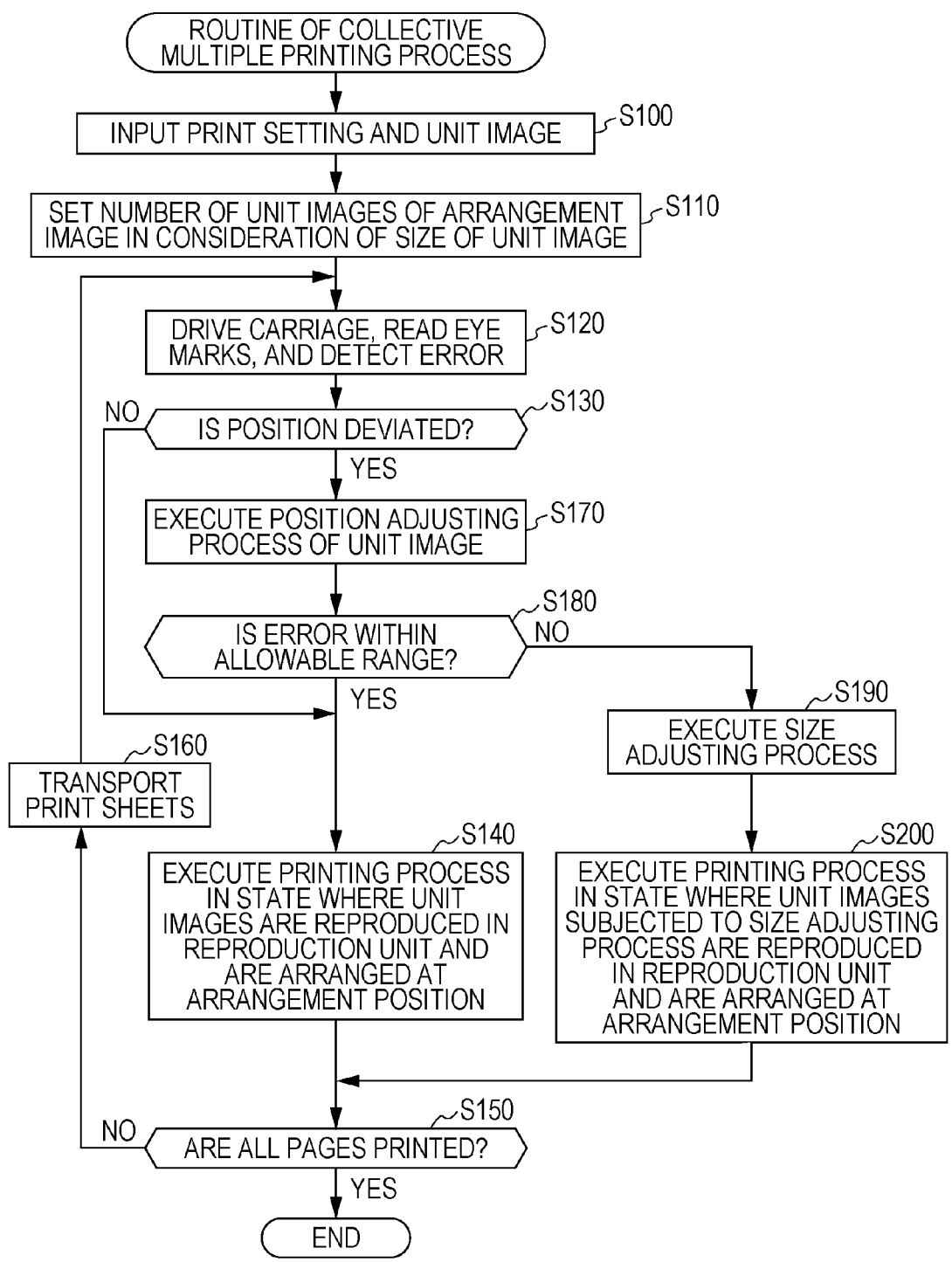
FIG. 2 is a flowchart illustrating an exemplary routine of a collective multiple printing process.
Figure 3:
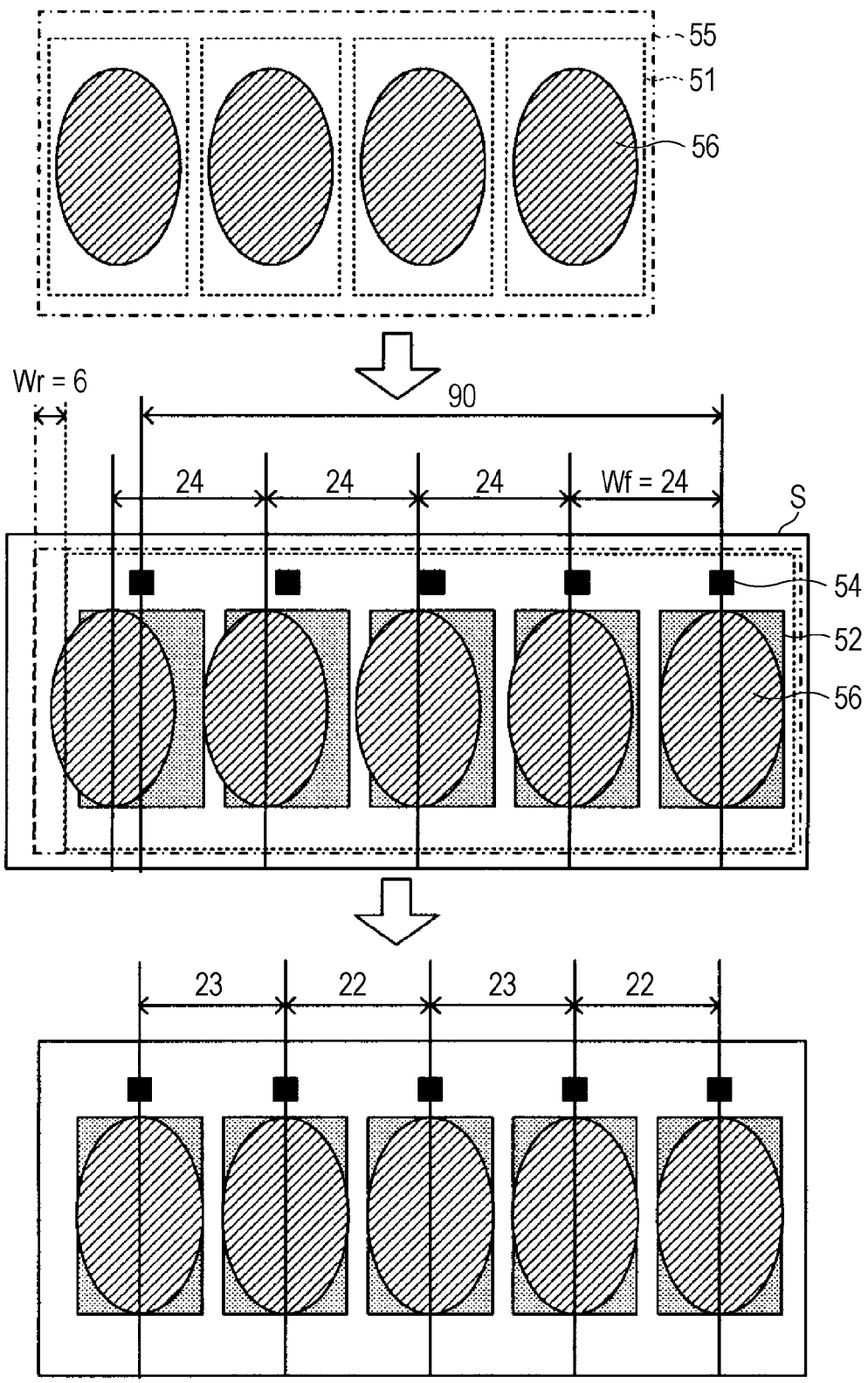
FIG. 3 is an explanatory diagram illustrating an arrangement image and the arrangement position of unit images.
Figure 4:
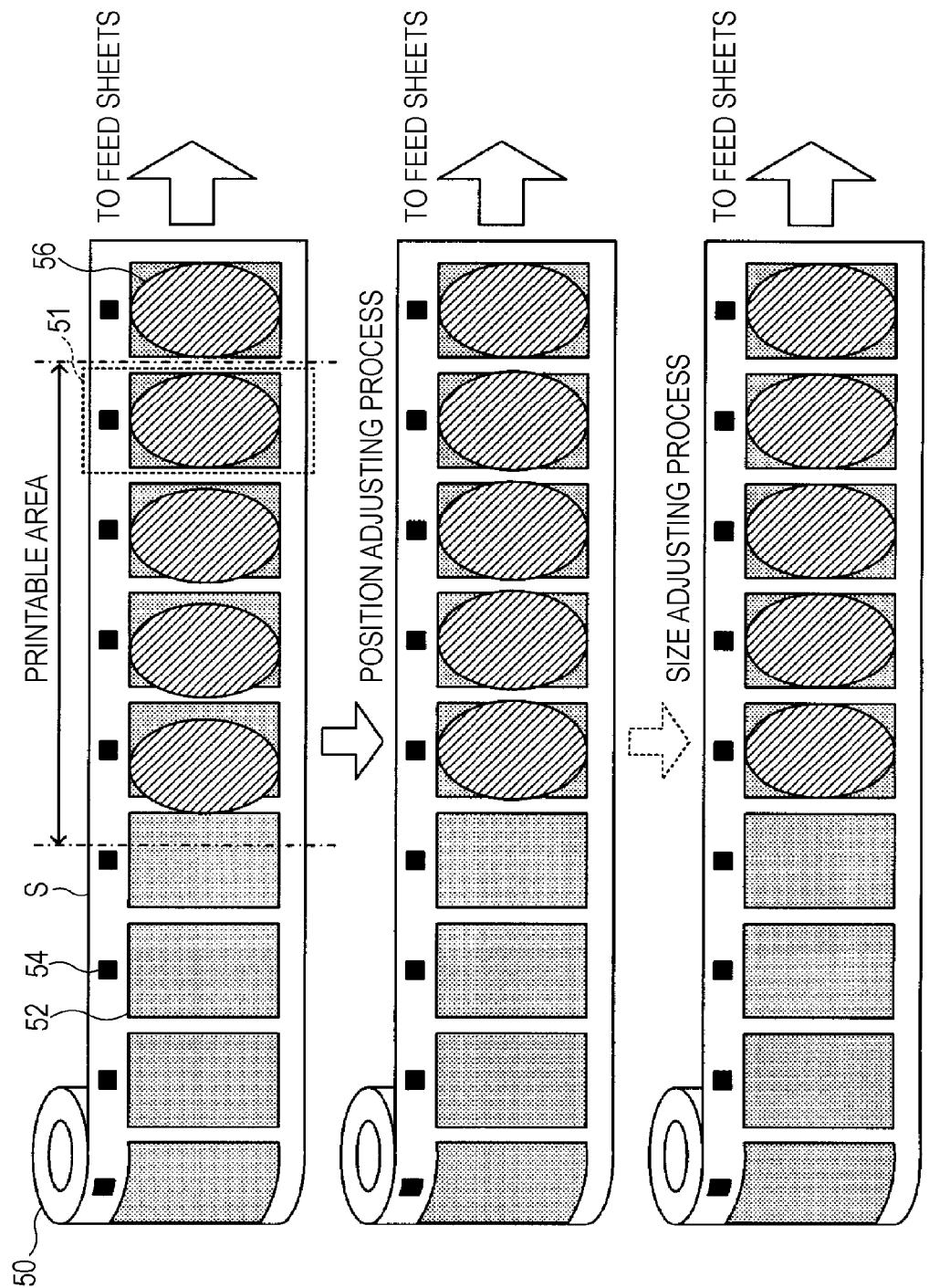
FIG. 4 is an explanatory diagram illustrating the adjustment of the arrangement position of the unit images.

Next, the collective multiple printing process of the printer 20 having the above-described configuration according to this embodiment will be described. First, the user carries out a basic printing process of forming the several basic images 52 in accordance with the eye marks 54 formed uniformly in the entire area of the roll sheet 50. The basic printing process may be executed by the printer 20 or another printer. The eye mark 54 may be formed together with the basic image 52 or may be formed earlier than the basic image 52. Next, the roll sheet 50, where the basic images 52 are formed, is loaded on the printer 20 to execute the printing process on the basic images 52. FIG. 2 is a flowchart illustrating an exemplary routine of the collective multiple printing process executed by the CPU 42 of the controller 41. The routine is stored in the flash ROM 43 and a print work to be executed in the printer 20 is received from a user PC 49 through an interface (not shown), for example, and executed. Here, as shown below in FIG. 3, a case where an arrangement image 55 in which the five predetermined number of unit images 56 are arranged in the transport direction of the print sheet S is printed so as to be superimposed on the basic images 52 will mainly be described. FIG. 3 is an explanatory diagram illustrating the arrangement image 55 and the arrangement position of the unit images 56. The upper part shows the concept of the arrangement image 55. The middle part shows the concept before arrangement adjustment. The lower part shows the concept after arrangement adjustment. FIG. 4 is an explanatory diagram illustrating the adjustment of the arrangement position of the unit images 56. The upper part shows the concept before arrangement adjustment. The middle part shows the concept after arrangement adjustment. The lower part shows the concept after adjustment of the size.

When the routine starts, the CPU 42 first inputs the unit image (printing image) contained in the print work and also inputs the print setting (step S100). Here, the unit image 56 (see FIG. 3) is input as the unit image. A collective multiple printing instruction, information on an arrangement interval of the page areas 51, information on print speed, the total number of print copies (for example, the number of page areas 51), and the like are also input. Next, the CPU 42 sets the number of unit images (the predetermined number of two or more unit images) contained in the arrangement image 55 in consideration of the size of the unit image 56 (step S110). For example, the number of unit images can be requested to be calculated by dividing the length of the printable area by the logical width of print image data and removing the fraction. Next, the CPU 42 drives the carriage moving mechanism 30 to move the carriage 22, causes the reading sensor 25 to read the eye marks 54 formed on the print sheet S to detect the arrangement positions of the page areas 51 on the print sheet S, and detects an error of the positions of the basic images 52 (step S120). The error can be detected with the difference between the interval (that is, the interval of the page areas printed) of the eye marks 54 read by the reading sensor 25 and the interval (that is, the interval of the page areas to be printed) of the page areas 51 in the input print setting. The error detecting unit 46 is configured to detect the error.

Next, the CPU 42 determines whether there is a difference in the arrangement positions of the basic images 52 being formed on the print sheet S (step S130). This determination is executed depending on whether the value of the error is "0". Sometimes, the interval of the page areas is changed due to the expansion or contraction of a sheet depending on a dried state or a reserved state of the roll sheet 50. When the collective multiple printing process is executed on the print sheet S on the page areas without a change in the interval of the page areas, the difference may be made on images of printing products (see the middle part of FIG. 3). Here, it is determined whether there is a difference in the print images.

When it is determined in step S130 that there is no difference in the arrangement position, the printing process is executed by reproducing the input unit images 56 by the reproduction unit 45 and sequentially arranging the reproduced unit images 56 by the number (predetermined number) of unit images so as to form the arrangement image arranged at the arrangement position set in the print setting (step S140). Here, as shown in the upper part of FIG. 3, the printing process is executed by reproducing the unit images 56 and sequentially arranging the unit images 56 at the interval set in the print setting so as to form the arrangement image 55. The reproduction unit 45 can execute the process at a speed higher than that at which an image is formed by software, since the reproduction unit 45 is configured to execute the reproducing process by a circuit structure. The CPU 42 drives the sheet feeding mechanism 31 to fix the print sheets S, on which the basic images 52 are formed in the page areas 51 of the predetermined number, in the printable area. In this state, the CPU 42 drives the carriage moving mechanism 30 and drives the printing head 24 to eject the ink from nozzles 23 while scanning the printing head 24 in the scanning direction, so that the images which are based on the unit images 56 are formed on the predetermined number of basic images 52.

Subsequently, the CPU 42 determines whether all pages set in the print setting are printed (step S150). When it is determined that all pages are not printed, a process of transporting the print sheet S is executed (step S160) to execute processes subsequent to step S120. The determination whether all pages are printed can be executed on the basis of whether a value obtained by multiplying a repeated number in steps S120 to S160 by a predetermined number reaches the total print number stored in the print setting. The process of feeding the print sheets S is executed such that the CPU 42 drives the sheet feeding mechanism 31 to feed the print sheets S so that the areas of print sheets S, on which a plurality of next basic images 52 are formed, fall in the printable area. Alternatively, when it is determined in step S150 that all the pages are printed, the routine ends. In this way, when there is no difference in the positions of the plurality of basic images 52, the set collective multiple printing process is just executed.

Alternatively, when it is determined in step S130 that there is a difference in the arrangement positions, the CPU 42 executes a process of adjusting the arrangement position of the unit images (step S170). The position adjusting process is a process which is executed by the image adjusting unit 47 and in which the difference in the positions of the plurality of page areas 51 on the print sheet S and the positions of the images to be printed is detected as an error and the error is distributed to the position of each unit image. Here, the position adjusting process will be described with reference to FIG. 3. FIG. 3 shows that the interval of the page areas 51 on the print sheets S is shorter than the interval of the unit images 56 in the arrangement image 55 to be printed (that the print sheets S are contracted). In the position adjusting process, the interval of the page areas 51 is read by the reading sensor 25 and a correction amount of the arrangement image 55 is decided in pixel number unit of resolution unit. Next, when the position is corrected in interval unit of one page area 51, a fraction number equal to or smaller than one pixel may remain. Therefore, the fraction number is adjusted using the following expression. That is, the width (Wn) of an n-th page is a value obtained by subtracting an (n−1)-th fraction (where the fraction is removed) from an n-th fraction (where the fraction is removed). Under the assumption that a width of the logical arrangement image 55 is Wf, a correction amount of the arrangement image 55 is Wr, and the number of pages in the arrangement image 55 is Pf, Expression of $Wn=(n\times(Wf+Wr))/Pf-((n-1)\times(Wf+Wr))/Pf$ is used. For example, when Wf=96, Wr=6, and Pf=4, the fraction of the page area of n=1 becomes 22.5. Therefore, when the fraction is removed, the value of 22 is obtained. Then, a value of 23 is obtained in the page of n=2 and a value of 22 is obtained in the page of n=3, a value of 23 is obtained in the page of n=4. As a consequence, the unit images can be arranged as uniformly as possible, as shown in the middle part of FIG. 3 (see the lower part of FIG. 3 and the middle part of FIG. 4).

When the position adjusting process is executed, the CPU 42 determines whether the value of the error falls in an allowable range (step S180). This determination is executed to determine whether it is easy to observe the difference caused due to the deformation of an image, since the difference caused due to the deformation in the image occurs by the expansion and contraction of the basic image 52 even though the arrangement position is corrected. The allowable range may be set from experience as a range (for example, a range of several pixels) in which it is difficult to observe the image difference between the basic image 52 and the unit image 56. When the value of the error falls in the allowable range, the CPU 42 adjusts the arrangement position of the unit images 56 without the change in the unit images 56, and executes the printing process by reproducing the unit images 56 by the reproduction unit 45 and sequentially arranging the reproduced unit images 56 by the number (predetermined number) of unit images so that the arrangement image arranged at the adjusted arrangement position is formed in step S140. Subsequently, the above-described processes in steps S150 and 160 are executed, and the routine ends when all the pages are printed in step S150. In this way, when the difference caused due to the deformation of the image is small, only the arrangement position is adjusted. Therefore, the collective multiple printing process can be executed as simply as possible.

Alternatively, when the value of the error exceeds the allowable range in step S180, that is, when the unit image 56 is too much smaller or larger than the basic image 52, the CPU 42 executes the size adjusting process (step S190). Here, the size adjusting process is executed by the image adjusting unit 47. When the unit image 56 is larger than the basic image 52, the image adjusting unit 47 reduces the size of the unit image 56. When the unit image 56 is smaller than the basic image 52, the image adjusting unit 47 increases the size of the unit image 56. Subsequently, the CPU 42 executes the printing process by reproducing the size-adjusted unit images by the reproduction unit 45 and sequentially arranging the reproduced unit images 56 by the number (predetermined number) of unit images so that the arrangement image arranged at the adjusted arrangement position is formed (step S200). Subsequently, the above-described processes in steps S150 and S160 are executed, and the routine ends when all the pages are printed in step S150. In this way, when the value of the error exceeds the allowable range, the size adjusting process of processing the unit image 56 is executed. Therefore, even though it takes more time in comparison to the case where the reproduction unit 45 executes the reproducing, a user scarcely feels a sense of discomfort at the areas where the images overlap with each other.

Here, the constituent elements according to this embodiment correspond to the following constituent elements according to the invention. The printing mechanism 21, the carriage moving mechanism 30, and the sheet feeding mechanism 31 according to this embodiment correspond to an ejection executing unit according to the invention. The carriage moving mechanism 30 corresponds to a scanning unit. The sheet feeding mechanism 31 corresponds to a transporting unit. The reading sensor 25 and the controller 41 correspond to a position acquiring unit. The controller 41 corresponds to an image adjusting unit and an ejection controlling unit. The ink corresponds to a liquid. The print sheet S corresponds to a target. In this embodiment, the explanation of the operation of the printer 20 clarifies an example of a method of controlling a liquid ejecting apparatus according to the invention.

The above-described printer 20 according to this embodiment executes a collective multiple liquid ejecting process of ejecting ink so as to superimpose the arrangement image 55 on the predetermined number of basic images 52 formed on the print sheet S for every arrangement image 55 where the predetermined number of unit images 56 are arranged. When the collective multiple liquid ejecting process is executed, the arrangement positions of the predetermined number of basic images 52, at which the arrangement image 55 can be superimposed in the printable area, among the plurality of basic images 52 formed on the print sheet S are acquired by causing the reading sensor 25 to read the eye mark 54, the error between the acquired arrangement positions of the basic images and the arrangement positions of the unit images is detected, and the arrangement positions of the unit images 56 are adjusted by allocating the detected error to each unit image 56. Then, the collective multiple printing process is executed at the adjusted arrangement position by using the unit images. In this way, by acquiring the arrangement position of the predetermined number of basic images 52 at one time and correcting the error, the predetermined number of unit images 56 are formed on the basic images 52 at one time. Accordingly, it is possible to further shorten the processing time in the collective multiple liquid ejecting process, compared to a case where the position of the basic image is acquired for each one unit image to correct the position, for example. Moreover, by reading the eye mark 54, it is possible to acquire the arrangement position of the basic images 52 easily and reliably.

Since the area of the print sheet S on which the predetermined number of basic images 52 are formed is fixed in the printable area and the printing process is executed during scanning the printing head 24, the processing capability of the printer 20 can be utilized as much as possible and the processing time can further be shortened. Moreover, when the error exceeds the allowable range, the size adjusting process of expanding or contracting the unit images 56 is executed, thereby more reliably inhibiting the difference between the unit images and the basic images. Furthermore, since the unit images 56 are reproduced by the reproduction unit 45 provided as a basic function, the error is allocated to each reproduced unit image, and the arrangement positions of the unit images 56 are adjusted, it is possible to further shorten the processing time in the collective multiple liquid ejecting process by a simpler process by using the basic function.

The invention is not limited to the above-described embodiment, but may be modified in various forms within the technical scope of the invention.

In the above-described embodiment, for example, when the error exceeds the allowable range in step S180, the size adjusting process is executed in step S190. However, the size adjusting process may be omitted. Even though the size adjusting process is omitted, the arrangement positions are adjusted. Therefore, it is possible to inhibit the difference in the images and to further shorten the processing time.

Figure 5:
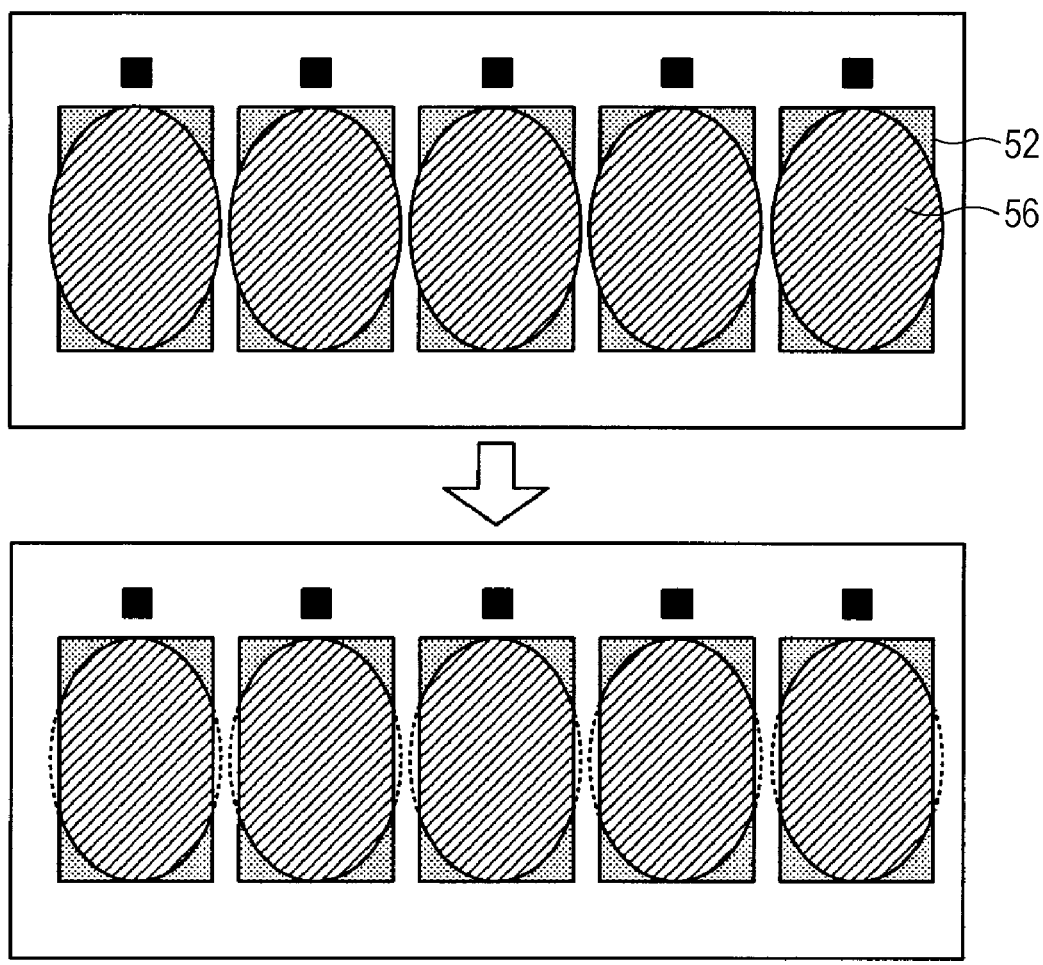
FIG. 5 is an explanatory diagram illustrating a process of removing areas of the unit images.
Figure 6:
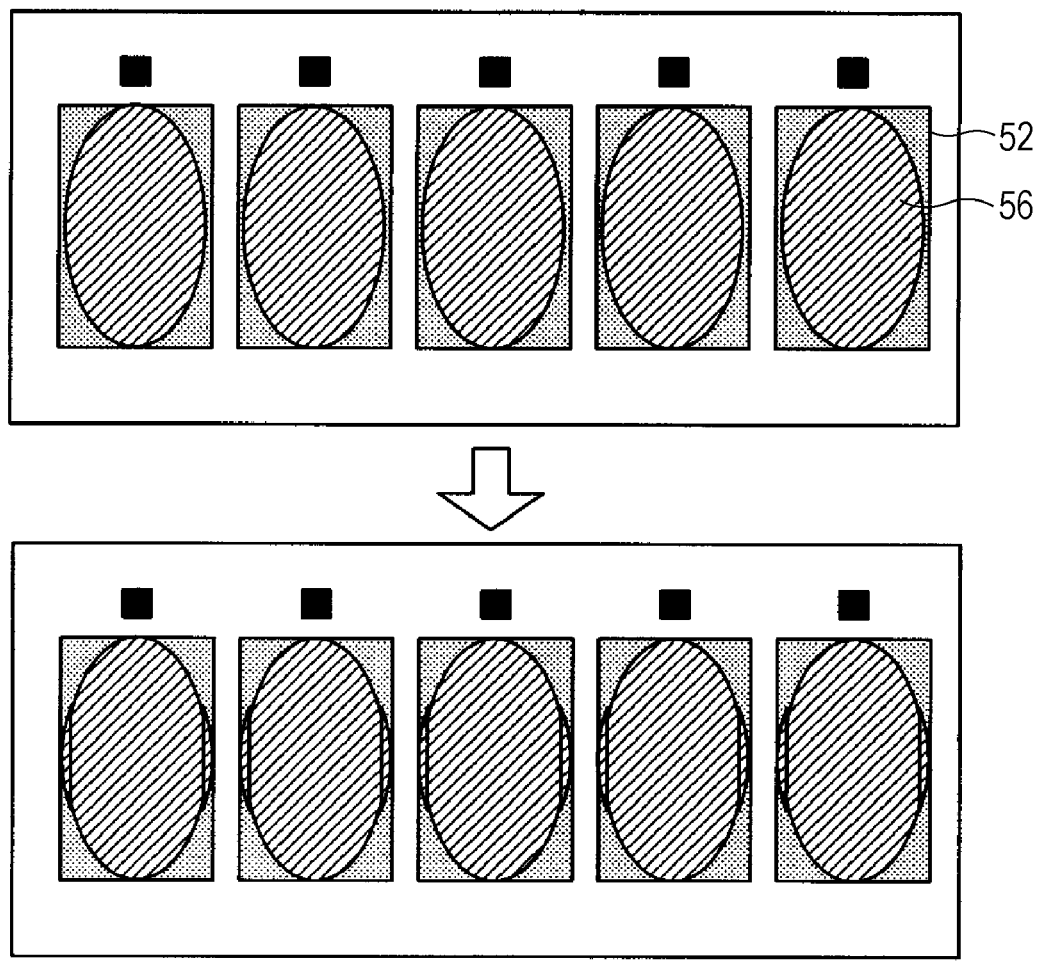
FIG. 6 is an explanatory diagram illustrating a process of inserting an end portion into the unit images.

In the above-described embodiment, the unit images 56 are expanded or contracted by the size adjusting process in step S190. However, the method of changing the unit images is not particularly limited. For example, when the unit images 56 are larger than the basic images 52, as shown in FIG. 5, excessive areas of the unit images 56 larger than the basic images 52 may be removed. FIG. 5 is an explanatory diagram illustrating a method of removing the areas of the unit images 56. Alternatively, when the unit images 56 are smaller than the basic images 52, as shown in FIG. 6, the end portions of the unit images 56 may repeatedly be inserted into the unit images 56 or specific color lines may be inserted into the unit images 56. FIG. 6 is an explanatory diagram illustrating a process of inserting an end portion into the unit images 56. By removing the excessive areas from the basic images 52, inserting the specific color lines into the unit images 56, and repeatedly inserting the end portions into the unit images 56, it is possible to inhibit the difference between the basic images and the unit images by a simpler process. Moreover, the size adjusting process may be executed in appropriate combination of the above-described methods.

In the above-described embodiment, the arrangement positions are read by the reading sensor 25 by scanning the reading sensor 25 and fixing the print sheet S. However, the arrangement positions may be read by the reading sensor 25 by fixing the reading sensor 25 and transporting the print sheet S. The arrangement positions of the basic images 52 are acquired by reading the eye marks 54. However, marks other than the eye marks 54 may be used or the basic images 52 themselves may be read to acquire the arrangement positions of the basic images 52. The reading sensor 25 is disposed in the printing head 24, but the invention is not particularly limited thereto. Instead, the reading sensor 25 may be disposed in a separate scanning member.

In the above-described embodiment, the collective multiple printing process is executed after the printing head 24 provided with the reading sensor 25 scans the print sheet S once. However, the printing process of the collective multiple printing process is executed in the going passage of the scanning of the printing head 24, the print sheet S is transported and fixed, and then the positions of the basic images 52 may be acquired by executing the reading process of the eye marks 54 in the coming passage of the scanning of the printing head 24. Then, since the positions of the basic images 52 are acquired in the coming passage by executing the printing process in the going passage, it is possible to further shorten the processing time in the collective multiple liquid ejecting process, compared to a case where the acquiring of the positions of the basic images 52 and the printing process are separately executed, for example.

In the above-described embodiment, the arrangement of the unit images 56 is reproduced by the reproduction unit 45 which serves as a circuit having the basic function. However, the invention is not limited thereto. The arrangement may be reproduced by software. In the above-described embodiment, upon adjusting the arrangement positions of the unit images 56, the reproduced unit images 56 are sequentially arranged by the number (predetermined number) of unit images to execute the printing process so that the unit images 56 are reproduced by the reproduction unit 45 and the arrangement image arranged in adjusted arrangement position is created. However, the invention is not particularly limited thereto. The arrangement image 55 in which the predetermined number of unit images 56 arranged in the adjusted arrangement positions are arranged is created and the collective multiple printing process may be executed on the basis of the created arrangement image 55.

Figure 7:
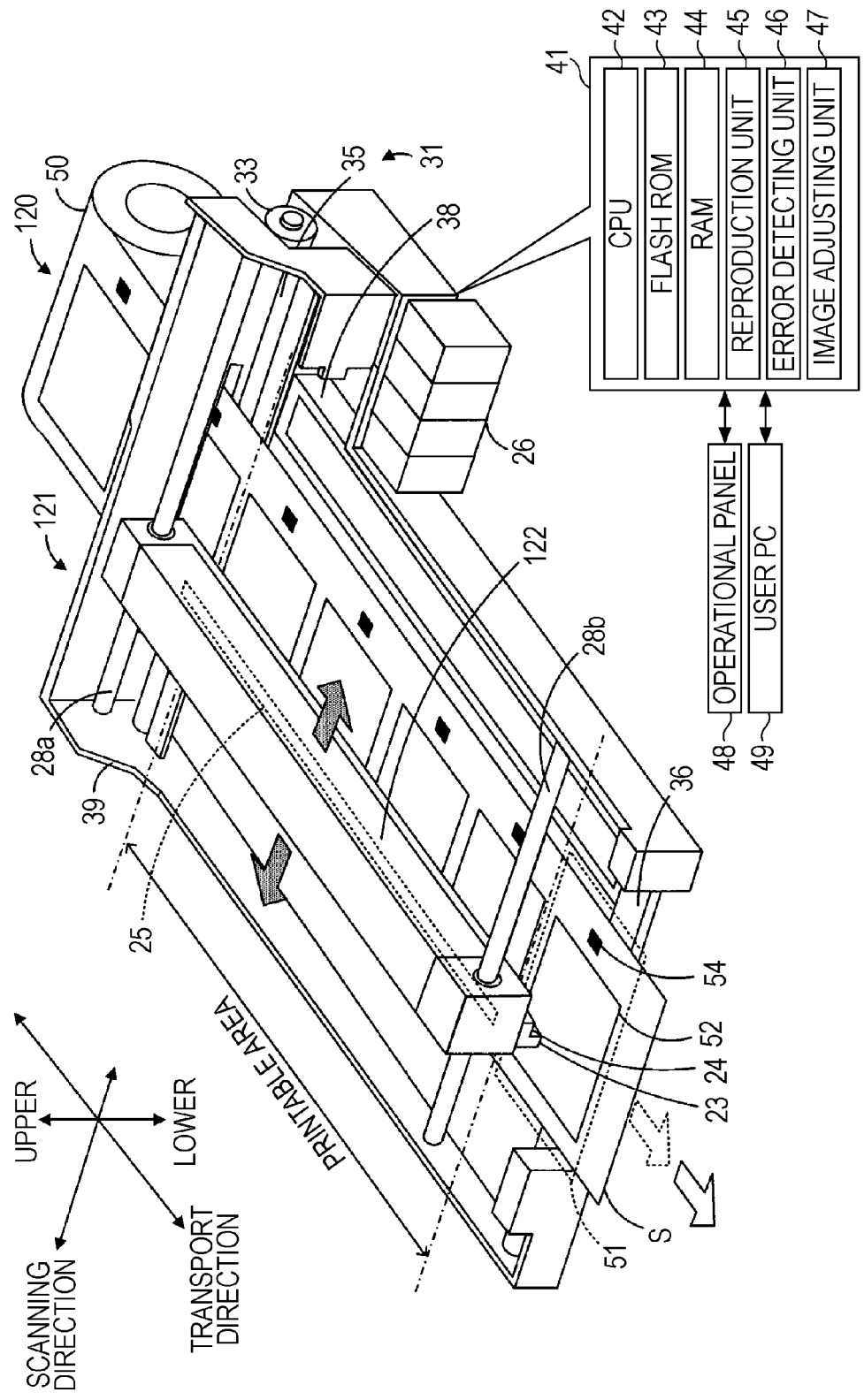
FIG. 7 is a diagram illustrating the overall configuration of a printer.

In the above-described embodiment, there is provided the printer 20 including the printing mechanism 21 which scans the carriage 22 in the same direction as the transport direction of the print sheet S. However, as shown in FIG. 7, there may be provided a printer 120 including a printing mechanism 121 which scans a carriage 122 in a direction perpendicular to the transport direction of the print sheet S. With such a configuration, it is possible to further shorten the processing time in the collective multiple liquid ejecting process. In addition, the print sheet S is fixed and the carriage 22 is scanned to execute the collective multiple printing process. However, the invention is not particularly limited thereto. Like a general printer, the collective multiple printing process may be applied to a printer which scans the carriage 22 in a width direction of the print sheet S and executes a printing process while moving the print sheet S. In this case, after the print sheet S is taken out from the roll sheet 50 and the positions of the basic images 52 are grasped, the roll sheet 50 is rolled again and the collective multiple printing process may be executed on the print sheet S. In addition, the printer 20 is an off-carriage type printing apparatus which mounts the ink cartridges 26 in the case 39. However, an on-carriage type printing mechanism 21 mounting the ink cartridges 26 on the carriage 22 may be used.

In the above-described embodiment, the liquid ejecting apparatus according to the invention is embodied as the printer 20. However, the liquid ejecting apparatus may be embodied as a fluid ejecting apparatus which ejects another liquid other than ink, a liquid-like material (dispersion liquid) in which particles of a functional material are dispersed, or a fluid state material such as gel. The liquid ejecting apparatus may be embodied as a fluid ejecting apparatus which ejects a solid material which can be ejected as a liquid material. Examples of the liquid ejecting apparatus include: a liquid ejecting apparatus which ejects a liquid, in which a material such as an electrode material or a color material is dispersed or dissolved, and which is used to manufacture a liquid crystal display, an EL (Electro Luminescence) display, and a field emission display; a liquid-like material ejecting apparatus which ejects a liquid-like material in which the electrode material or the color material is dispersed; and a liquid ejecting apparatus which ejects a liquid used as a sample as a precision pipette. In addition, examples of the liquid ejecting apparatus include: a liquid ejecting apparatus that ejects lubricant to a precision instrument such as a watch or a camera by the use of a pinpoint; a liquid ejecting apparatus that ejects on a substrate a transparent resin liquid such as ultraviolet cure resin to form a fine hemispheric lens (optical lens) for an optical communication element; a liquid ejecting apparatus that ejects an etchant such as acid or alkali to etch a substrate; a fluid state material ejecting apparatus which ejects a gel; and a particle ejecting apparatus which ejects particles such as toner.

In the above-described embodiment, the printer 20 is a printing apparatus including the printing mechanism 21. However, the printer may be a multi-functional printer including a scanner, a FAX machine, or the like. Although described in the embodiment of the printer 20, the invention may be applied to a method of controlling the liquid ejecting apparatus or a program of the method of the controlling the liquid ejecting apparatus.

What is claimed is:

1. A liquid ejecting apparatus executing a collective multiple liquid ejecting process of ejecting a liquid so as to superimpose the predetermined number of unit images on basic images formed on a target, the liquid ejecting apparatus comprising:
    an ejection executing unit which ejects the liquid onto the target from an ejecting head;
    a position acquiring unit which acquires arrangement positions of the predetermined number of two or more basic images, at which an arrangement image in which the predetermined number of two or more unit images are arranged among the plurality of basic images formed on the target is superimposed;
    an image adjusting unit which detects an error between the acquired arrangement positions of the basic images and arrangement positions of the predetermined number of two or more unit images, and adjusts the arrangement positions of the unit images by allocating the detected error to each unit image; and
    an ejection controlling unit which controls the ejection executing unit to execute the collective multiple liquid ejecting process of ejecting the liquid by using the unit images of which the arrangement positions are adjusted, so that each arrangement image in which the predetermined number of two or more unit images are arranged is superimposed on the predetermined number of two or more basic images formed on the target;
    wherein the image adjusting unit determines whether the sizes of the unit images falls in a predetermined allowable range with respect to the size of the basic images on the basis of the detected error,
    wherein the image adjusting unit changes the unit images on the basis of the acquired sizes of the basic images and adjusts the arrangement positions of the changed unit images when the determination result exceeds the predetermined allowable range, and adjusts the arrangement positions of the unit images without changing the unit images when the determination result falls in the predetermined allowable range, and
    wherein the ejection executing unit executes the collective multiple liquid ejecting process in the state where the arrangement positions of the unit images are adjusted.

2. The liquid ejecting apparatus according to claim 1,
    wherein the ejection executing unit includes a scanning unit which scans the ejecting head in a liquid ejection area where the arrangement image in which the predetermined number of two or more unit images are arranged is formed on the target and a transporting unit which transports the target in each area of the target where the predetermined number of two or more basic images are formed, and
    wherein the ejection controlling unit controls the transporting unit so that the area of the target where the predetermined number of two or more basic images are formed is fixed in the liquid ejection area and forms the unit images, of which the arrangement positions are adjusted, on the predetermined number of two or more fixed basic images by controlling the scanning unit and the ejecting head so as to scan the ejecting head.

3. The liquid ejecting apparatus according to claim 1,
    wherein when the unit image is larger than basic image upon changing the unit image, the image adjusting unit executes at least one of removing an excessive area of the unit image larger than the basic image and contracting the unit, and
    wherein when the unit image is smaller than the basic image upon changing the unit image, the image adjusting unit executes at least one of inserting a specific color into the unit image, repeatedly inserting an end portion of the unit image into the unit image, and expanding the unit image.

4. The liquid ejecting apparatus according to claim 1, wherein the image adjusting unit reproduces the unit images by using a reproduction function provided as a basic function, allocates the detected error to the reproduced unit images, and adjusts the arrangement positions of the unit images.

5. The liquid ejecting apparatus according to claim 1, wherein the position acquiring unit acquires the arrangement positions of the predetermined number of two or more basic images, at which the arrangement image is superimposed, by scanning the target and executing reading by a reading sensor.

6. A liquid ejecting apparatus executing a collective multiple liquid ejecting process of ejecting a liquid so as to superimpose the predetermined number of unit images on basic images formed on a target, the liquid ejecting apparatus comprising:
    an ejection executing unit which ejects the liquid onto the target from an ejecting head;
    a position acquiring unit which acquires arrangement positions of the predetermined number of two or more basic images, at which an arrangement image in which the predetermined number of two or more unit images are arranged among the plurality of basic images formed on the target is superimposed;
    an image adjusting unit which detects an error between the acquired arrangement positions of the basic images and arrangement positions of the predetermined number of two or more unit images, and adjusts the arrangement positions of the unit images by allocating the detected error to each unit image; and
    an ejection controlling unit which controls the ejection executing unit to execute the collective multiple liquid ejecting process of ejecting the liquid by using the unit images of which the arrangement positions are adjusted, so that each arrangement image in which the predetermined number of two or more unit images are arranged is superimposed on the predetermined number of two or more basic images formed on the target
    wherein the plurality of basic images are arranged on the target in a transport direction of the target,
    wherein the ejection executing unit includes a scanning unit which scans an ejecting head ejecting the liquid in a liquid ejection area, where the arrangement image in which the predetermined number of two or more unit images are arranged is formed, in the transport direction of the target and a transporting unit which transports the target in each area of the target where the predetermined number of two or more basic images are formed, and the ejecting head is provided with a reading sensor which reads an image, wherein the ejection controlling unit controls the transporting unit so that the area of the target where the predetermined number of two or more basic images are formed is fixed in the liquid ejection area, forms the arrangement image, of which the arrangement positions are adjusted, on the predetermined number of two or more fixed basic images by controlling the scanning unit and the ejecting head so that the ejecting head scans outward along the transport direction of the target, transports and fixes the target so that the area of the target where the predetermined number of two or more subsequent basic images are formed is placed in the liquid ejection area after the formation of the arrangement image, and controls the scanning unit after the fixation of the target so that the ejecting head scans inward along the transport direction of the target, and wherein the position acquiring unit acquires the arrangement positions of the predetermined number of two or more subsequent basic images when the reading sensor reads the target by scanning the coming passage of the transport direction of the target.

7. The liquid ejecting apparatus according to claim 6, wherein the ejection executing unit includes a scanning unit which scans the ejecting head in a liquid ejection area where the arrangement image in which the predetermined number of two or more unit images are arranged is formed on the target and a transporting unit which transports the target in each area of the target where the predetermined number of two or more basic images are formed, and wherein the ejection controlling unit controls the transporting unit so that the area of the target where the predetermined number of two or more basic images are formed is fixed in the liquid ejection area and forms the unit images, of which the arrangement positions are adjusted, on the predetermined number of two or more fixed basic images by controlling the scanning unit and the ejecting head so as to scan the ejecting head.

8. The liquid ejecting apparatus according to claim 6, wherein the image adjusting unit reproduces the unit images by using a reproduction function provided as a basic function, allocates the detected error to the reproduced unit images, and adjusts the arrangement positions of the unit images.

9. The liquid ejecting apparatus according to claim 6, wherein the position acquiring unit acquires the arrangement positions of the predetermined number of two or more basic images, at which the arrangement image is superimposed, by scanning the target and executing reading by a reading sensor.

10. A method of controlling a liquid ejecting apparatus which includes an ejection executing unit ejecting a liquid onto a target from an ejecting head and which executes a collective multiple liquid ejecting process of ejecting the liquid so that predetermined unit images are superimposed on basic images formed on the target, the method comprising:
  (a) acquiring arrangement positions of the predetermined number of two or more basic images, at which an arrangement image in which the predetermined number of two or more unit images are arranged among the plurality of basic images formed on the target is superimposed;
  (b) adjusting the arrangement positions of the unit images by allocating an error between the acquired arrangement positions of the basic images and the arrangement positions of the predetermined number of two or more unit images on which the collective multiple liquid ejecting process is executed, to the unit images, determining whether the sizes of the unit images falls in a predetermined allowable range with respect to the size of the basic images on the basis of the detected error, changing the unit images on the basis of the acquired sizes of the basic images and adjusting the arrangement positions of the changed unit images when the determination result exceeds the predetermined allowable range, and adjusting the arrangement positions of the unit images without changing the unit images when the determination result falls in the predetermined allowable range; and
  (c) controlling the ejection executing unit to execute the collective multiple liquid ejecting process of ejecting the liquid in the state where the arrangement positions are adjusted in (b), so that each arrangement image in which the predetermined number of two or more unit images are arranged is superimposed on the predetermined number of two or more basic images formed on the target, wherein the ejection executing unit executes the collective multiple liquid ejecting process in the state where the arrangement positions of the unit images are adjusted.

11. The liquid ejecting method according to claim 10, wherein the ejection executing unit includes a scanning unit which scans the ejecting head in a liquid ejection area where the arrangement image in which the predetermined number of two or more unit images are arranged is formed on the target and a transporting unit which transports the target in each area of the target where the predetermined number of two or more basic images are formed, the method further comprising controlling the transporting unit so that the area of the target where the predetermined number of two or more basic images are formed is fixed in the liquid ejection area and forms the unit images, of which the arrangement positions are adjusted, on the predetermined number of two or more fixed basic images by controlling the scanning unit and the ejecting head so as to scan the ejecting head.

12. The liquid ejecting method according to claim 10, wherein when the unit image is larger than basic image upon changing the unit image, the method further comprises executing at least one of removing an excessive area of the unit image larger than the basic image and contracting the unit, and wherein when the unit image is smaller than the basic image upon changing the unit image, the method further comprises executing at least one of inserting a specific color into the unit image, repeatedly inserting an end portion of the unit image into the unit image, and expanding the unit image.

13. The liquid ejecting method according to claim 10, wherein adjusting the arrangement positions comprises reproducing the unit images by using a reproduction function provided as a basic function, allocating the detected error to the reproduced unit images, and adjusting the arrangement positions of the unit images.

14. The liquid ejecting method according to claim 10, wherein acquiring the arrangement positions comprises acquiring the arrangement positions of the predetermined number of two or more basic images, at which the arrangement image is superimposed, by scanning the target and executing reading by a reading sensor.

15. A method of controlling a liquid ejecting apparatus which includes an ejection executing unit ejecting a liquid onto a target from an ejecting head and which executes a collective multiple liquid ejecting process of ejecting the liquid so that predetermined unit images are superimposed on basic images formed on the target, the method comprising:
- (a) acquiring arrangement positions of the predetermined number of two or more basic images, at which an arrangement image in which the predetermined number of two or more unit images are arranged among the plurality of basic images formed on the target is superimposed;
- (b) adjusting the arrangement positions of the unit images by allocating an error between the acquired arrangement positions of the basic images and the arrangement positions of the predetermined number of two or more unit images on which the collective multiple liquid ejecting process is executed, to the unit images; and
- (c) controlling the ejection executing unit to execute the collective multiple liquid ejecting process of ejecting the liquid in the state where the arrangement positions are adjusted in (b), so that each arrangement image in which the predetermined number of two or more unit images are arranged is superimposed on the predetermined number of two or more basic images formed on the target;

wherein the plurality of basic images are arranged on the target in a transport direction of the target, wherein the ejection executing unit includes a scanning unit which scans an ejecting head ejecting the liquid in a liquid ejection area, where the arrangement image in which the predetermined number of two or more unit images are arranged is formed, in the transport direction of the target and a transporting unit which transports the target in each area of the target where the predetermined number of two or more basic images are formed, and the ejecting head is provided with a reading sensor which reads an image, the method further comprising controlling the transporting unit so that the area of the target where the predetermined number of two or more basic images are formed is fixed in the liquid ejection area, forms the arrangement image, of which the arrangement positions are adjusted, on the predetermined number of two or more fixed basic images by controlling the scanning unit and the ejecting head so that the ejecting head scans outward along the transport direction of the target, transports and fixes the target so that the area of the target where the predetermined number of two or more subsequent basic images are formed is placed in the liquid ejection area after the formation of the arrangement image, and controlling the scanning unit after the fixation of the target so that the ejecting head scans inward along the transport direction of the target, and wherein acquiring the arrangement positions comprises acquiring the arrangement positions of the predetermined number of two or more subsequent basic images when the reading sensor reads the target by scanning the coming passage of the transport direction of the target.

16. The liquid ejecting method according to claim 15, wherein the ejection executing unit includes a scanning unit which scans the ejecting head in a liquid ejection area where the arrangement image in which the predetermined number of two or more unit images are arranged is formed on the target and a transporting unit which transports the target in each area of the target where the predetermined number of two or more basic images are formed, the method further comprising controlling the transporting unit so that the area of the target where the predetermined number of two or more basic images are formed is fixed in the liquid ejection area and forms the unit images, of which the arrangement positions are adjusted, on the predetermined number of two or more fixed basic images by controlling the scanning unit and the ejecting head so as to scan the ejecting head.

17. The liquid ejecting method according to claim 15, wherein adjusting the arrangement positions comprises reproducing the unit images by using a reproduction function provided as a basic function, allocating the detected error to the reproduced unit images, and adjusting the arrangement positions of the unit images.

18. The liquid ejecting method according to claim 15, wherein acquiring the arrangement positions comprises acquiring the arrangement positions of the predetermined number of two or more basic images, at which the arrangement image is superimposed, by scanning the target and executing reading by a reading sensor.

* * * * *